Nov. 10, 1925.
W. C. ANTHONY
1,560,791
SHOVEL
Filed Nov. 10, 1924    2 Sheets-Sheet 1
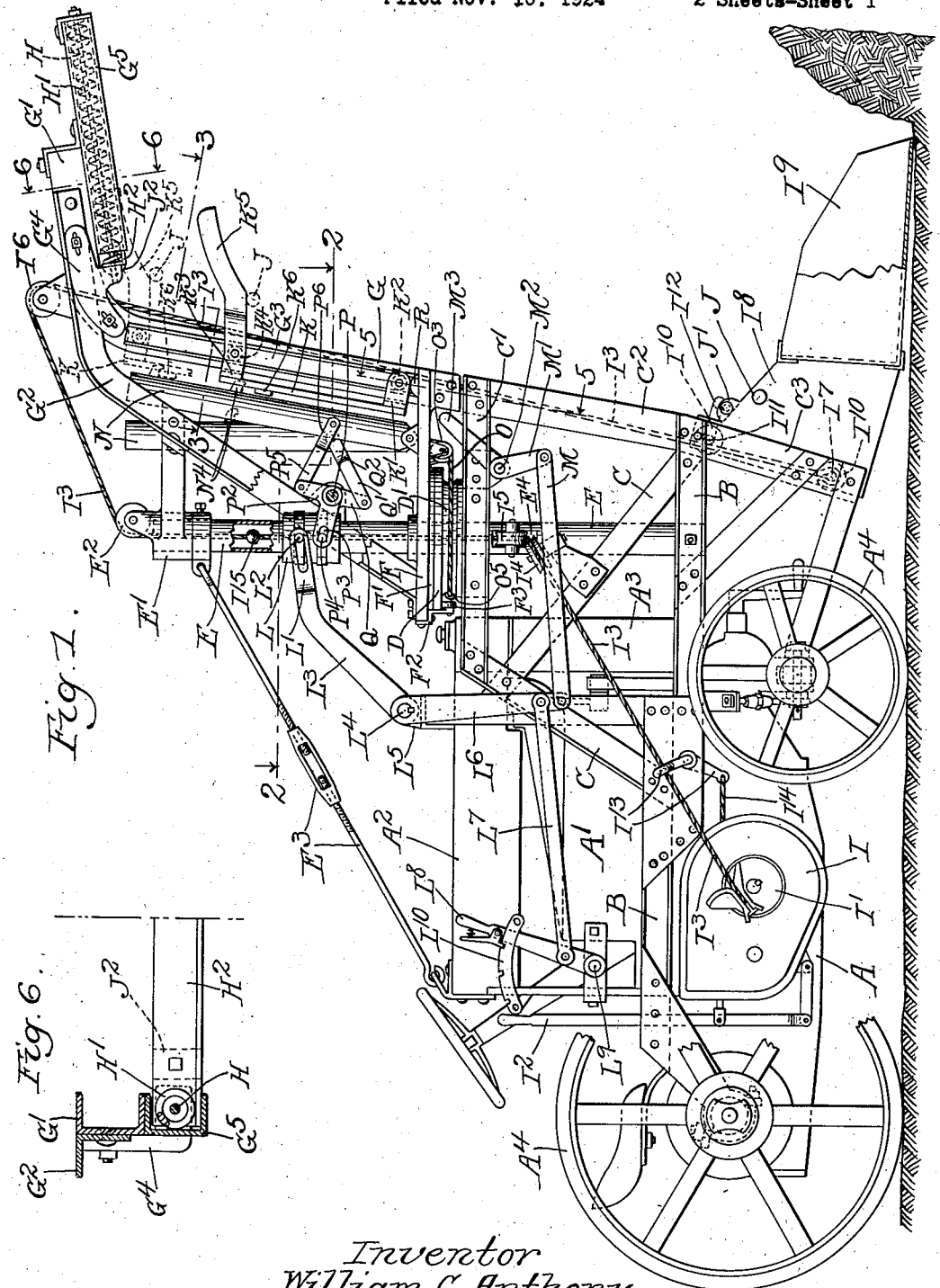
Inventor
William C. Anthony.
by Parker + Carter,
Attorneys.

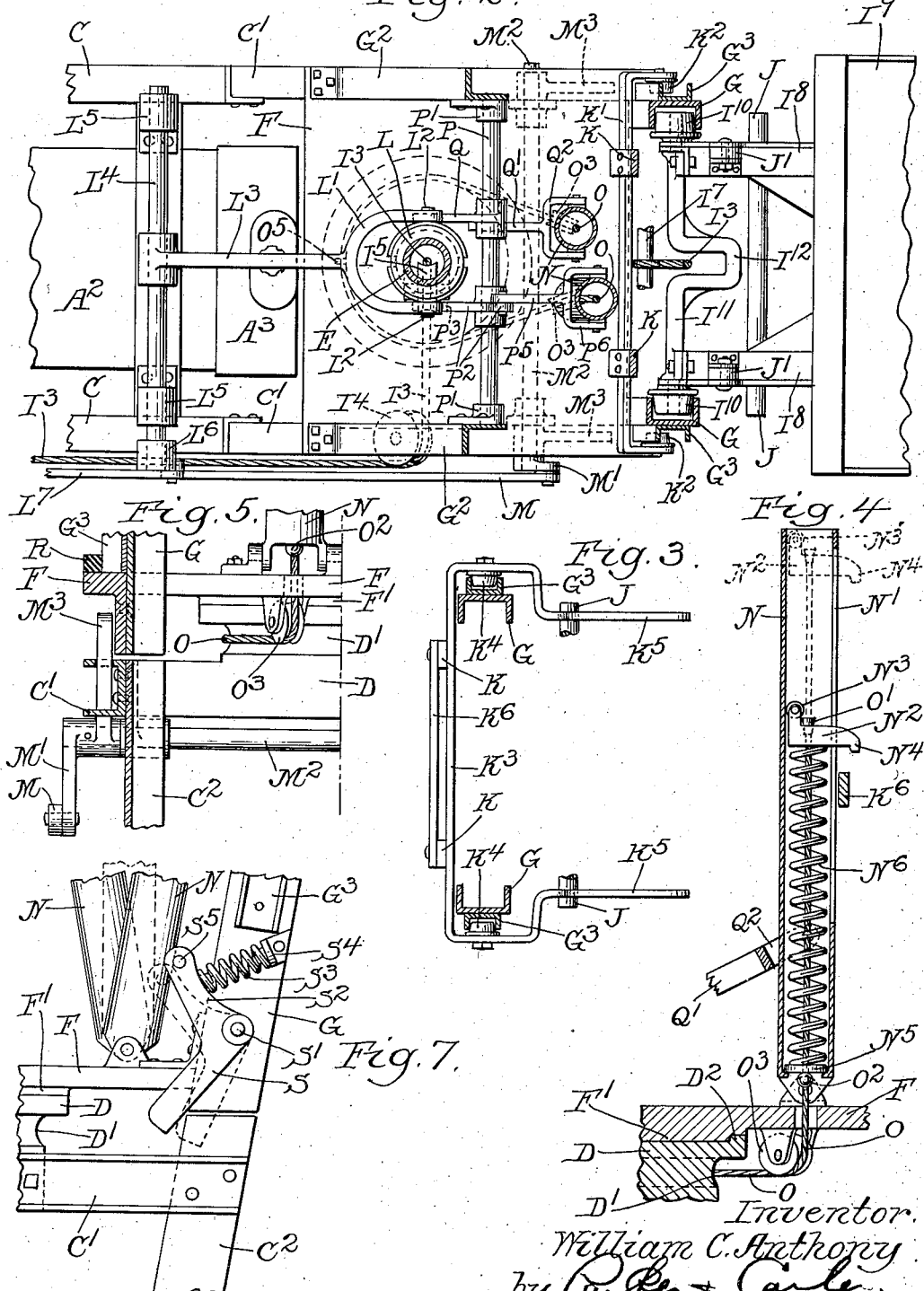

Patented Nov. 10, 1925.

1,560,791

UNITED STATES PATENT OFFICE.

WILLIAM C. ANTHONY, OF STREATOR, ILLINOIS, ASSIGNOR TO ANTHONY COMPANY, OF STREATOR, ILLINOIS, A CORPORATION OF ILLINOIS.

SHOVEL.

Application filed November 10, 1924. Serial No. 748,806.

*To all whom it may concern:*

Be it known that I, WILLIAM C. ANTHONY, a citizen of the United States, residing at Streator, in the county of La Salle and State of Illinois, have invented a certain new and useful Improvement in Shovels, of which the following is a specification.

This invention relates to a shovel, and particularly to a shovel adapted for use in connection with an automotive vehicle in which the vehicle is driven forward to load the shovel. One object of the invention is to provide in connection with such a shovel means whereby the shovel after being raised to a certain point may be turned to permit lateral dumping. Another object is to provide in such a shovel means whereby the shovel may be loaded and then raised and turned without the moving of the vehicle. Another object is to provide means in connection with such a shovel whereby the shovel as it is raised is automatically turned laterally. Other objects will appear from time to time throughout the specification and claims.

My invention is illustrated more or less diagrammatically in the accompanying drawings, wherein:

Figure 1 is a side elevation of the shovel with parts in section, showing the shovel in position for digging;

Figure 2 is a horizontal cross section taken on line 2—2 of Figure 1;

Figure 3 is a cross section taken on line 3—3 of Figure 1, showing the dolly;

Figure 4 is a vertical cross section on an enlarged scale showing one of the spring containing dolly engaging members;

Figure 5 is a vertical cross section taken on line 5—5 of Figure 1, showing a portion of the locking and turning mechanism;

Figure 6 is a section taken on line 6—6 of Figure 1 showing the spring retaining framework at the top of the shovel;

Figure 7 is a side elevation showing in detail a modified form of the locking mechanism.

Like parts are designated by like characters throughout.

A is a tractor having an engine $A^1$, a fuel tank $A^2$, a radiator $A^3$, and wheels $A^4$ $A^4$. The shovel framework is generally supported upon the tractor. Surrounding the tractor is a shovel mechanism made up of generally horizontal frame work B, which rests upon the tractor and is supported from it. The details of this framework will not be described fully because they form no part of the present invention.

Rising from the main framework is an elevated framework made up of a plurality of members C, supporting at their top frame members $C^1$. $C^2$ is a track made up of a plurality of pairs of channels which extend downwardly from the upper frame to the bottom and are bent rearwardly as at $C^3$. Supported on the frame bars $C^1$ is a platform D. It is provided with a grooved portion $D^1$ and has in its upper face an upwardly extending annular flange $D^2$.

E is a hollow vertical column fixedly mounted on the framework and supported at its lower end in the frame B, extending upwardly through the platform D to the top of the machine. It is provided at its upper end with a collar $E^1$ in which is pivoted a sheave $E^2$. $E^3$ is a brace by means of which the column E is braced to the rear of the tractor. The column E is also provided adjacent its lower end with an opening $E^4$.

F is an upper turn table platform member and is provided with a downwardly extending portion $F^1$ which mates with the lower platform portion D and lies within the raised flange $D^2$ and is retained in position therein so that it can rotate concentrically therewith.

$F^2$ is an arm fastened to the rear of the turn table member F. It carries an inverted roller $F^3$ which bears against the under face of the member D, and thus prevents upsetting of the upper turn table assembly as it rotates. There may be more than one of such rollers.

Rising from this turn table is a main track G made up of channel sections as shown. This track itself is generally normally upwardly inclined and is provided adjacent its upper end with a laterally inclined portion $G^1$. $G^2$ $G^2$ are supporting and bracing members which are fixed at their lower ends to the turn table member F. The upper ends engage and steady and support the track member G. On the outer side of each of the track members G is a second and smaller track member $G^3$. These second track members in the form here shown do not extend onto the laterally bent portion of the upper track member G¹. At its upper end the track member G is provided with a reinforcing and connecting plate G⁴. Beneath the laterally bent portion G¹ of the track G is a channel section G⁵. Within this section, surrounding rods H, are helical springs H¹. Mounted on the rods H and bearing against the springs H¹ is a spring compressing member H² here shown as a member having an angular cross section.

I is a winch mechanism mounted on the tractor and driven by the tractor engine. It is provided with a spool I¹ and a controlling lever or handle I² by means of which it is operated. The details of the winch mechanism are not here shown because they form no part of the present invention. It is sufficient to say that by means of the winch mechanism the shovel may be raised or lowered or held in any position intermediate the upper and lower limits of its travel.

I³ is a hoisting cable. It is mounted at one end on the spool I¹. It passes first over a sheave I⁴, thence about the sheave I⁵, through the opening E⁴ into the interior of the column E, up through the column, over the sheave E², over a sheave I⁶ mounted in the upper end of the shovel framework, down about this sheave and is fastened at its lower end to a bar or axle I⁷ on the framework I⁸ which carries an open-sided bucket I⁹. The bucket framework I⁸ has four wheels I¹⁰ which rides in the track members C² and G. At its lower end the framework is provided with the above mentioned axle I⁷ which is in the form here shown a simple straight axle. The upper axle I¹¹ which carries the upper wheels is provided with a loop I¹². This loop is provided so that when the bucket is raised, the cable I³ does not come in contact with the upper axle but swings into the loop. This position is illustrated in Figure 2. I¹³ is a winch controlling lever, pivoted in the framework and provided with a connection I¹⁴ to the winch controlling mechanism. I¹⁵ is a stop on the cable I³. When the shovel has moved upward to the full dumping position, the stop I¹⁵ contacts the lever I¹³ and thus automatically throws the winch mechanism out of operation and stops further hoisting movement.

J is a contact shaft mounted in the framework I⁸ of the bucket, and it is adapted to contact and operate the parts which will be described below. J¹ J¹ are removable contact or wearing points mounted on the upper side of the bucket frame I⁸, and they are adapted to contact, when the bucket approaches its upper limit, removable contact or wearing faces J² on the member H².

Adapted to ride in the track members G³ in the upper part of the shovel, is a dolly made up of longitudinal members K K, which carry at their lower ends cross members K¹ terminating in forwardly bent portions which carry rollers K² K². At their upper ends the members K are joined by a cross member K³ which carries the rollers K⁴ K⁴ and is provided with two forwardly extending curved arms K⁵ K⁵. There is an additional cross member K⁶ which is attached to the members K K adjacent their upper ends.

L is a controlling collar slidably mounted on the upper half of the column E. L¹ is a yoke provided with loops which engage pins L² on the collar L. The yoke is fastened to a lever L³ which is itself secured on a rock shaft L⁴ carried in suitable bearings L⁵. At one end of the rock shaft is a lever L⁶ which has pivoted to it adjacent its lower end a connecting rod L⁷ which at its rear end is joined to a controller lever L⁸. This lever is pivoted at L⁹ and operates in conjunction with a quadrant L¹⁰ by means of which its position may be adjustably and selectively secured. Carried at the lower end of the lever L⁶ is a connecting rod M. This rod is pivoted at its forward end on a bell crank M¹ which is fastened to a rock shaft M². This shaft carries adjacent each end a locking lug M³ by means of which the turn table is held against accidental rotation or displacement.

Pivoted on the upper surface of the turn table portion F is a pair of spring containing tubes N. Each has a slot N¹ in its side adjacent the track structure. Within each is mounted a spring plate member N² provided with a roller N³ adapted to contact the interior of the tube and provided opposite the roller with a hook point N⁴ which projects outward through the slot N¹. Inside at the bottom of the tube is loosely mounted for motion the perforated plate N⁵. Above the plate N⁵ and bearing at one end against it is a helical spring N⁶. This spring at its other end supports the plate N².

O is a cable having an end in each of said tubes. Thus each end of the cable O is fastened at O¹ to the member N² and the cable passes downward through the helical spring N⁶ and through the perforation in the plate N⁵. The cable O has on it a pair of stops O², and each end of the cable leads downward from its tube N and passes about a sheave O³ and about the portion D¹ of the lower platform member D, and is secured thereto at O⁵.

P is a rocker shaft carried in bearings P¹ P¹ in the upper track supporting structure. Fixed on the shaft P is a bell crank lever P². This lever has a slotted bottom portion P³ which engages a pin P⁴ on the collar L. At its other end the bell crank P² engages the shaft P⁵ of a yoke P⁶ which surrounds and is pivoted upon the lower tube end as shown particularly in Figures 1 and 2. This tube is the one on the right side of the tractor looking in the forward direction.

Q is a bell crank mounted also on the shaft P in the same manner as that described with respect to the bell crank P². It also is provided with a slotted end engaging a pin on the collar L, and it also engages the shaft Q¹ of a yoke Q² which surrounds and is pivoted upon the lower end of the tube N.

R, R are shock absorbing bumper blocks. In the form here shown they are preferably of rubber. They are mounted on the upper turn table F adjacent the bottom of the small track members G³, and the lower roller or stop or end of the dolly strikes upon them as the dolly falls.

As shown in Figure 7 a modified form of the lock is used. The lock consists of a pair of locking lugs S S, each pivoted at S¹ on the outside of the track section G. These lugs are provided with lever arms S² which are joined together by a shaft S⁵. S³ is a helical spring. It is supported in a fitting S⁴ on the side of the track G and bears against the lever arms S². There may be one spring or there may be a spring on each side of the track structure bearing against each fitting S⁴ on the track structure, bearing against each lever arm S².

The spring presses against the lever arm and thus the shaft S⁵ is held in contact with the tubes N. When they are both upright, the locking lugs will occupy generally the position shown in dotted lines, holding the upper turn table structure from movement. When one of the tubes is moved forward, the shaft S remaining in contact with the tube is also moved forward and rotates the two locking lugs out of engagement into the full line position shown in Figure 7. In that position relative movement of the turn tables is possible.

Although I have shown an operative device, still it is obvious that many changes might be made in size, shape and arrangement of parts without departing materially from the spirit of my invention; and I wish, therefore, that my showing be taken as in a sense diagrammatic.

The plates G⁴ while their main function is to serve as reinforcing and connecting members, also support the rods H and act as stops for the angles H².

The use and operation of my invention are as follows:

Normally when the shovel is to be used, the shovel proper is lowered to the position shown in Figure 1. The vehicle is then run forward against a pile of dirt or other material and a quantity of it is forced into the shovel. The clutch mechanism is then operated so as to rotate through the winch, the spool and the cable, and the hoisting cable is wound up and the shovel raised along the track, and finally comes upon the laterally bent portion and is tipped and dumped. The shovel is then lowered to the filling position and another load is forced into the shovel.

Instead of being dumped immediately a load of material may be raised part way up the track structure, the vehicle may then be run around to some suitable position, and the dump may be made at that position by raising the shovel out along the laterally bent part of the track.

For certain purposes it is desired to rotate the shovel after a load has been taken so that dumping may be facilitated and moving of the tractor in order to position it for proper dumping may be reduced. For this purpose the turn table mechanism is provided. A locking means is provided so that under normal operation the turn table operating mechanism remains inactive. When, however, it is desired to cause the shovel to turn, the mechanism controlling the sliding collar on the shaft is operated, and the collar is raised or lowered. If it is desired to have the shovel turn toward the right, that is when looking from rear to the front of the tractor, the collar is raised. This rocks the shaft P and throws the right hand tube N forward and the left hand tube N rearward. Then the shovel mechanism is put in operation, and as the shovel rises it contacts the forwardly projecting arms K⁵, thus engaging and carrying upward with it the dolly which moves on the smaller tracks. As the dolly moves upward, it engages the forwardly projecting hook N⁴, and thus as it continues to move upward, draws in upon the cable. Since the cable is in fixed relation about the curved portion D of the lower turn table, it rotates the upper turn table to the right, drawing in the opposite end of the cable O and compressing the spring N⁶. Thus the turn table and the upper half of the tractor section, after the bucket is upon it, is rotated to the right and the bucket may be held in this position while the vehicle is moved, or the dump may be completed all at one time by continuing to pull in against the bucket cable until the bucket moves out upon the laterally bent track portion and is dumped.

As the bucket is allowed to return, the dolly moves with it, the cable is allowed to move downward under the influence of the compression spring in the left hand tube, and by means of the spring the turn table is moved in to the central position, and thus return movement is accomplished before the bucket is in position to move from the upper track section to the lower track section C².

If turning and dumping are to continue, the members operating the controlling collar on the helical column are left in the same position, and the bucket is simply moved up and down, each time automatically turning for the dump. Readjustment of the controls will, of course, cause the shovel to turn in the opposite direction, and when the parts are brought back so that both the tubes N remain approximately vertical, the lug M³ will lock against turning, and the two tubes being approximately vertical, the hooks N⁴ do not engage the dolly and it simply moves up and down without engagement with the hooks.

When the dolly has been raised to the position shown in dotted lines in Figure 1, practically all of the vertical movement of the shovel has been accomplished. It remains only for the shovel to move laterally out upon the laterally bent portion to come into the dumping position. The arms K⁵ are shaped so as to permit this with practically no further raising of the dolly, the points J rotating out along the cross arms K⁵.

I claim:

1. In combination in a hoisting shovel, a shovel frame, a bucket adapted to move therealong, means for moving the bucket and means for swinging the frame laterally.

2. In combination in a hoisting shovel, a tractor, a shovel frame, mounted thereon, a bucket adapted to move therealong, means for moving the bucket and means for swinging the frame laterally.

3. In combination in a hoisting shovel, a shovel frame, a bucket adapted to move therealong, means for moving the bucket and means for swinging the frame laterally from its normal working position and returning it thereto.

4. In combination in a hoisting shovel, a tractor, a shovel frame, mounted thereon, a bucket adapted to move therealong, means for moving the bucket and means for swinging the frame laterally from its normal working position and returning it thereto.

5. In combination in a hoisting shovel, a shovel frame, a bucket adapted to move therealong, means for moving the bucket and means for swinging the frame laterally as the shovel moves therealong.

6. In combination in a hoisting shovel, a shovel frame, a bucket adapted to move therealong, means for moving the bucket and means for swinging the frame laterally from its normal position as the bucket moves upward therealong and for returning the frame to its normal position as the shovel moves downward therealong.

7. In combination in a hoisting shovel, a shovel frame, a bucket adapted to move therealong, means for moving the bucket and means for swinging a portion of the frame laterally.

8. In combination in a hoisting shovel, a shovel frame, a bucket adapted to move therealong, means for moving the bucket and means for swinging a portion of the frame laterally, from its normal position as the bucket moves upward therealong, and for returning the frame to its normal position as the shovel moves downward therealong.

9. In combination in a hoisting shovel a frame, a bucket adapted to move therealong, means for moving the bucket, automatic means for swinging the frame laterally from its normal position in response to movement of the bucket therealong in one direction, and means for returning the frame to its normal position in response to the movement of the bucket therealong in the other direction.

10. In combination in a hoisting shovel, a shovel frame, a bucket adapted to move therealong, means for moving the bucket and means for swinging the frame laterally, and means for locking the frame against movement whereby the bucket travels along the frame and the frame remains in its normal position.

11. In combination in a hoisting shovel, a shovel frame, a bucket adapted to move therealong, means for moving the bucket and means for swinging the frame laterally from its normal position as the bucket moves upward therealong and for returning the frame to its normal position as the shovel moves downward therealong, and means for locking the frame against movement whereby the bucket travels along the frame and the frame remains in its normal position.

12. In combination in a hoisting shovel, a shovel frame, a bucket adapted to move therealong, means for moving the bucket and means for swinging a portion of the frame laterally from its normal position as the bucket moves therealong, and for returning the frame to its normal position as the shovel moves downward therealong, and means for locking the frame against movement whereby the bucket travels along the frame and the frame remains in its normal position.

13. In combination in a hoisting shovel, a tractor, a shovel frame mounted thereupon and a bucket adapted to move therealong, means for moving said bucket by the driving motor of the tractor, and automatic means for turning the shovel and a portion of the track mechanism as the shovel moves upward therealong, and for returning the frame to the normal position as the shovel moves downward therealong.

14. In combination in a hoisting shovel, a tractor, a shovel frame mounted thereupon and a bucket adapted to move therealong, means for moving said bucket by the driving motor of the tractor, and selective automatic means for turning the shovel and a portion of the track mechanism as the shovel moves upward therealong, and for returning the frame to the normal position as the shovel moves downward therealong.

15. In combination in a hoisting shovel, a tractor, a shovel frame mounted thereupon and a bucket adapted to move therealong, means for moving said bucket by the driving motor of the tractor, and automatic means for turning the shovel and a portion of the track mechanism as the shovel moves upward therealong, and for returning the frame to the normal position as the shovel moves downward therealong, and locking means adapted to prevent swinging of the frame whereby the bucket moves vertically along the frame which remains in its normal position.

16. In combination in a hoisting shovel, a tractor a shovel frame mounted thereupon and a bucket adapted to move therealong, means for moving said bucket by the driving motor of the tractor, and selective automatic means for turning the shovel and a portion of the track mechanism as the shovel moves upward therealong, and for returning the frame to the normal position as the shovel moves downward therealong, and locking means adapted to prevent swinging of the frame whereby the bucket moves vertically along the frame which remains in its normal position.

17. In combination in a hoisting shovel a tractor, a shovel frame mounted thereupon, a bucket adapted to move therealong, means for hoisting said bucket from the driving motor of the tractor, automatic means for stopping the hoisting movement of the shovel at the completion of its upward movement, and selective automatic means for turning the shovel and a portion of the track mechanism as the shovel moves upward therealong, and for returning the frame to the normal position as the shovel moves downwardly therealong.

18. In combination in a hoisting shovel, a vehicle and a main frame fixedly mounted thereon, and an auxiliary frame movably mounted on said main frame, each of said frames carrying a portion of a bucket track and a bucket adapted to move along said track, means for moving the bucket, and means for swinging the movable frame in response to movement of the bucket.

19. In combination in a hoisting shovel, a vehicle and a main frame fixedly mounted thereon, and an auxiliary frame movably mounted on said main frame, each of said frames carrying a portion of a bucket track and a bucket adapted to move along said track, means for moving the bucket, and means for swinging the movable frame in response to movement of the bucket, in combination with a turn table assembly having one part on said fixed frame and another part mounted on said movable frame.

Signed at Chicago, county of Cook and State of Illinois, this 6th day of November, 1924.

WILLIAM C. ANTHONY.